Feb. 22, 1927. 1,618,429
E. C. HEAD
HOB FOR CUTTING GEARS
Original Filed Jan. 23, 1922  2 Sheets-Sheet 1
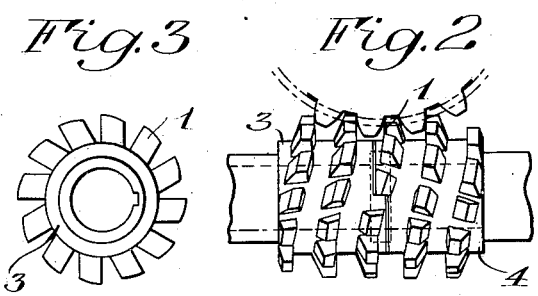
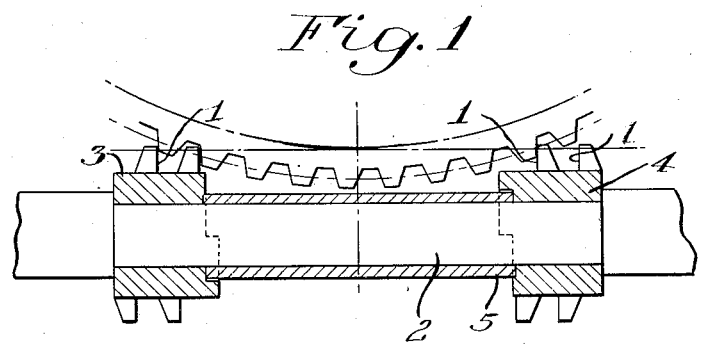
INVENTOR.
Ernest C. Head
BY Harold R. Stonebraker,
his ATTORNEY Feb. 22, 1927.

E. C. HEAD

HOB FOR CUTTING GEARS

Original Filed Jan. 23. 1922

1,618,429

INVENTOR.
Ernest C. Head
BY Harold E. Stonebraker
his ATTORNEY

Patented Feb. 22, 1927.

1,618,429

UNITED STATES PATENT OFFICE.

ERNEST C. HEAD, OF ROCHESTER, NEW YORK, ASSIGNOR TO GLEASON WORKS, OF ROCHESTER, NEW YORK, A CORPORATION OF NEW YORK.

HOB FOR CUTTING GEARS.

Original application filed January 23, 1922, Serial No. 531,106. Divided and this application filed September 21, 1923. Serial No. 664,108.

My invention relates to a hob for cutting gears, this application being a division of an application filed January 23, 1922, Serial No. 531,106.

The object of the invention is to provide a hob for cutting gears in large quantity production in a practicable and economical way, and while designed particularly for herringbone gears, it is adaptable to other types as well, such as spur and bevel gears, both straight and curved or spiral teeth.

The invention has for a further purpose to provide a hob for cutting a pair of gears, so constructed as to insure proper contact between intermeshing teeth entirely across the faces of the gears.

More particularly, the invention has for its purpose to afford a hob that will cut a gear with teeth of uniform curvature and thickness throughout its length, irrespective of the depth of the tooth, which may vary from end to end.

Still another object of the invention is to afford a gear cutting hob that can be fed or traversed across the gear face faster than hobs heretofore constructed, and in this manner materially increasing the speed of production and adding to the efficiency of the machine.

To these and other ends, the invention comprises the structure that will appear clearly from the following description, when read in conjunction with the accompanying drawings, the novel features being pointed out in the claims following the description.

In the drawings:

Figure 1 is a longitudinal sectional view of a hob embodying one form of the invention, and showing a gear in side elevation partially broken away;

Figure 2 is a side elevation of a hob for producing a pinion, in cutting relation to the latter;

Figure 3 is an end view of the hob;

In general, the invention embodies a hob having its cutting elements arranged for operation only on one side of a tooth at a time, the cutting edges of the hob, designated at 1, being disposed perpendicular or substantially perpendicular to the rotary axis 2 of the hob.

For convenience of operation, the hob may be made in two sections 3 and 4, which are spaced apart by a sleeve 5 when cutting a large gear, as illustrated in Figure 1, and are brought together for cutting a pinion as illustrated in Figure 2, in order that the hob may cut slightly beneath a tangent to the base circle or base line of the gear.

The hob sections need not necessarily be arranged on the same spindle, since other practical and successful arrangements are possible for carrying out the underlying idea of a pair of hobs or hob sections positioned in cutting relation to a blank on the same side of a plane containing the blank axis. The two hobs or hob sections are offset endwise of their respective axes from a line normal to the hox axes and passing through the center of the blank, the distance through which each hob is thus offset being fixed during the cutting operation and predetermined in accordance with the size of the blank.

The hob and blank are rotated in engagement with each other at fixed speeds, as usual in hobbing machines, and the hob may be caused to traverse the gear face by any suitable mechanism. If the hob traverses entirely across the face of the gear, the tooth is of uniform depth from end to end, but if the hob is moved only partially across the face of the gear, the end of the tooth would be of less depth than the center, owing to the tools of the hob travelling in a concave path over the bottom of each tooth space.

Proper contact between the teeth of intermeshing gears is obtained by my improvement, regardless of the depth of the teeth, by having the cutting edges of the hob disposed perpendicularly to its axis of rotation, so that the curve of the profile of the tooth remains the same at the deepest portion and throughout its length, even though there are portions of varying depth. In other words, the thickness of the tooth is constant throughout the length of the tooth, measured on the pitch line or any line parallel thereto, and this condition will follow in the production of any type of gear with a hob of this character, having its cutting edges disposed perpendicularly to its axis of rotation.

By arranging the generating edges of the hob perpendicular or substantially perpendicular to the hob axis, it is possible to secure considerably faster production. This is illustrated in Figures 4 to 7, which show a comparison of the present hob with the usual type of hob as previously constructed, both as to successive feeding positions of the hob across the blank and as to the length of contact between a generating edge and the tooth face being generated.

Figure 4:
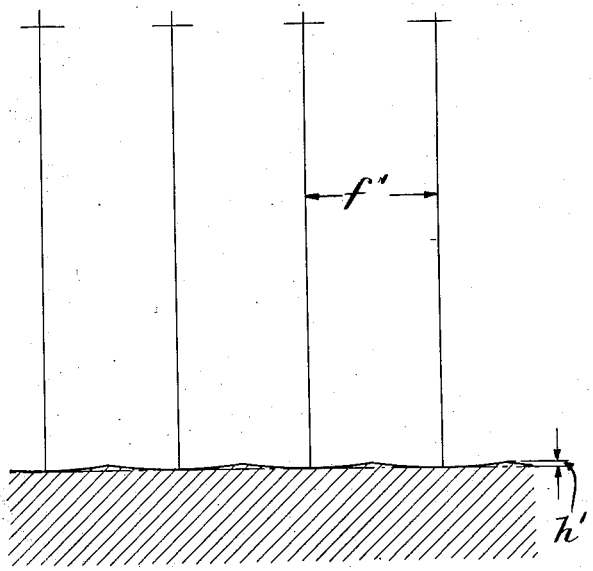
Figure 4 is an enlarged diagrammatic sectional view showing the relation of a generating edge to the side of a tooth in successive traversing or feeding positions of the hob across the face of the blank.
Figure 5:
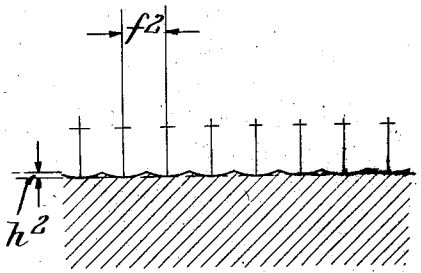
Figure 5 is a similar view of the usual type of hob as heretofore constructed.

By using a generating edge that is perpendicular or substantially perpendicular to the rotary axis of the hob, a longer or more sweeping cut with reference to the side of the tooth is obtained, as indicated in Figure 4, which shows successive cutting positions of the hob as it is fed across the face of the blank. In prior types of hobs, with the generating edge disposed at a considerable angle to the hob axis, a short arc of movement of the generating edge with reference to the side of the tooth is obtained, as in Figure 5, and consequently a slower feed of the hob is necessary than with the present hob illustrated by Figure 4. The distances between successive feeding positions of the hob are indicated at $f'$, $f^2$, while $h'$, $h^2$ indicate the heights of the uncut portions between successive feeding positions.

Figure 6:
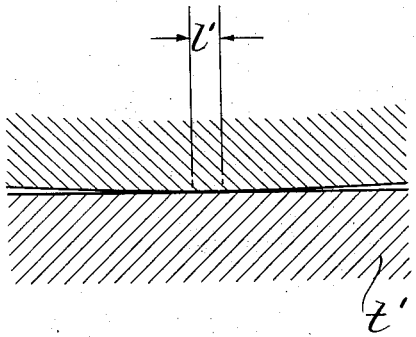
Figure 6 is an enlarged diagrammatic sectional view showing the path of travel of a generating edge with reference to the side of a gear tooth for one position of the hob.
Figure 7:
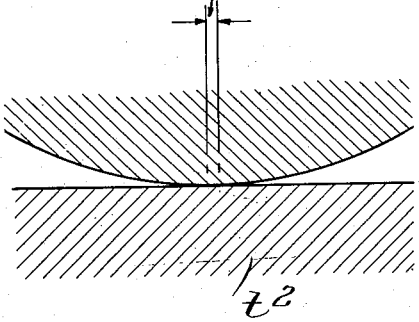
Figure 7 is a similar view of the usual type of hob as heretofore constructed.

When disposed perpendicular or substantially perpendicular to the hob axis, the generating edge is in contact with the side of the tooth for a longer distance, shown at $l'$ in Figure 6, than with the old type of hob where the generating edge is disposed at a considerable angle to the hob axis, as illustrated at $l^2$ in Figure 7. The theoretical arrangement for maximum speed of feeding the hob is with the generating edge exactly perpendicular to the hob axis, but in practice, it is sometimes desirable to incline the generating edge slightly with reference to the hob axis in order to afford a better tooth bearing, prevent interference with the tooth of the blank, and obtain the necessary cutting clearance.

Such inclination of the generating edge with reference to the hob axis is preferably no more than enough to obtain the clearance referred to, and permit practical cutting. Any such slight variation of the generating edge from a perpendicular realtionship to the hob axis is not enough to diminish substantially the intimate contact desirable between the tooth surface being generated and the theoretical helical surface formed by successive generating edges of the hob, and it is this relationship between the generating edges of the hob and the tooth surface that makes possible the feeding speed referred to, and which constitutes an important characteristic of my improved hob.

Another important advantage in my invention lies in the use of two hobs, one of which generates on one side of the teeth while the other generates on the opposite side of the teeth, which enables cutting gears of any size or any number of teeth, and also materially increases the cutting speed with hobs having generating edges characterized by a substantially zero pressure angle, and by varying the relationship between the two hobs, the thickness of the teeth on the blank can be modified.

While I have described the invention with reference to a specific embodiment, including a particular setting of the hob, the structure or setting of the hob may be modified without departing from the intent of the invention or scope of the following claims, and this application is intended to cover any adaptations or embodiments following in general the principles of the invention and including such departures from the present disclosure as come within known or customary practice in gear cutting and may be applied to the essential features hereinbefore set forth.

I claim:

1. A gear cutting hob having a series of cutting teeth arranged to conform to a helix and provided with generating side cutting edges, each generating edge being straight from end to end and substantially perpendicular to the rotary axis of the hob.

2. A gear cutting hob comprising a pair of separable cutting sections, said sections each including a series of cutting teeth arranged to conform to a helix and provided with generating side cutting edges, the generating edges of one section operating on one side of a tooth of the blank being cut and the generating edges of the other section operating on the other side of a tooth of the blank being cut and each of said cutting sections, when in cutting position, being offset fixed distances in the direction of their axes from a line passing through the center of the blank being cut and normal to the hob axis.

3. A gear cutting hob comprising a pair of separable cutting sections mounted on a common supporting spindle and adapted to be spaced apart for operation at different parts of a gear, said sections each including a series of cutting teeth arranged to conform to a helix and provided with generating side cutting edges, each generating edge being straight from end to end and substantially perpendicular to the rotary axis of the hob.

4. A gear cutting hob comprising a pair of separable cutting sections mounted on a common supporting spindle and adapted to be spaced apart for operation at different parts of a gear, said sections each including a series of cutting teeth arranged to conform to a helix and provided with generating side cutting edges, each generating edge being straight from end to end and substantially perpendicular to the rotary axis of the hob, the generating edges on one section generating one side of a tooth of the blank to be cut and the generating edges on the other section generating the opposite side of a tooth of the blank to be cut.

5. A hob for cutting symmetrical teeth on gears comprising a series of cutting teeth conforming to a helix and having single generating edges arranged on the same side of the helix, such generating edges being substantially perpendicular to the rotary axis of the hob.

6. A hob for cutting symmetrical teeth on gears comprising a series of cutting teeth conforming to a helix and having single finishing edges arranged on the same side of the helix, such finishing edges being substantially perpendicular to the rotary axis of the hob, said hob, when in cutting position, being offset a fixed distance in the direction of its axis from a line passing through the center of the blank to be hobbed and normal to the hob axis.

7. A gear cutting hob including a series of helically arranged cutting teeth provided with generating side cutting edges, each generating cutting edge having an outer portion which when in cutting position lies between a tangent to the base circle and center of the gear blank and is substantially perpendicular to the rotary axis of the hob.

In witness whereof, I have hereunto signed my name.

ERNEST C. HEAD.